US012706929B2

(12) United States Patent
Almeida et al.

(10) Patent No.: US 12,706,929 B2

(45) Date of Patent: Aug. 11, 2026

(54) COMMUNITY-BASED SITUATION-AWARE ACCESS CONTROL ENFORCEMENT IN ZERO TRUST ARCHITECTURES

(71) Applicant: Dell Products L.P., Round Rock, TX (US)

(72) Inventors: Thais Luca Marques de Almeida, São Gonçalo (BR); Werner Spolidoro Freund, Rio de Janeiro (BR); Roberto Nery Stelling Neto, Rio de Janeiro (BR); Fabricio Matheus Takaki, Valinhos (BR); Vicente J.P. Amorim, João Monlevade (BR)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 18/889,174

(22) Filed: Sep. 18, 2024

(65) Prior Publication Data

US 2026/0081931 A1 Mar. 19, 2026

(51) Int. Cl.
*H04L 9/40* (2022.01)

(52) U.S. Cl.
CPC ...... *H04L 63/1416* (2013.01); *H04L 63/1433* (2013.01)

(58) Field of Classification Search
CPC ........................ H04L 63/1416; H04L 63/1433
USPC ........................................................... 726/22
See application file for complete search history.

(56) References Cited

U.S. PATENT DOCUMENTS

| | | | | |
|---|---|---|---|---|
| 9,202,052 | B1 * | 12/2015 | Fang | G06F 21/552 |
| 9,275,348 | B2 * | 3/2016 | Bhatt | H04L 63/1408 |
| 9,596,256 | B1 * | 3/2017 | Thomson | H04L 63/1441 |
| 9,900,329 | B2 * | 2/2018 | Wilson | G06F 16/9024 |
| 10,104,109 | B2 * | 10/2018 | Singla | G06F 21/577 |
| 10,594,713 | B2 * | 3/2020 | McLean | H04L 63/1433 |
| 10,986,106 | B2 * | 4/2021 | Muddu | G06N 20/20 |
| 11,140,123 | B2 * | 10/2021 | Chakkirala | G06Q 10/40 |
| 11,729,204 | B1 * | 8/2023 | Coull | H04L 63/1433 726/25 |
| 11,790,090 | B2 * | 10/2023 | Belfiore, Jr. | G06Q 10/0635 726/25 |
| 11,973,791 | B1 * | 4/2024 | Li | G06N 5/02 |
| 11,997,125 | B2 * | 5/2024 | Gurtu | G06N 3/0442 |
| 2018/0159876 | A1 * | 6/2018 | Park | H04L 63/1425 |
| 2018/0191763 | A1 * | 7/2018 | Hillard | H04L 63/1416 |
| 2019/0036938 | A1 * | 1/2019 | Sander | H04L 63/1441 |
| 2019/0089725 | A1 * | 3/2019 | Anachi | G06N 20/00 |
| 2020/0036743 | A1 * | 1/2020 | Almukaynizi | G06N 3/044 |

(Continued)

OTHER PUBLICATIONS

Disa, NSA, "Department of Defense Zero Trust Reference Architecture," 2022.

(Continued)

*Primary Examiner* — Dant B Shaifer Harriman
(74) *Attorney, Agent, or Firm* — Workman Nydegger

(57) ABSTRACT

One example method includes identifying, in a knowledge graph that represents a ZT (zero trust) environment, communities that each comprise one or more entities, computing a risk of granting access to one of the entities, when the risk exceeds a threshold, alerting the ZT environment in its entirety about a possible threat involving the entity regarding which the risk was computed, and propagating information about the threat to the entities that are members of the community to which the one entity belongs.

20 Claims, 3 Drawing Sheets

(56) References Cited

U.S. PATENT DOCUMENTS

| | | | | |
|---|---|---|---|---|
| 2020/0136923 | A1* | 4/2020 | Altshuler | H04L 41/145 |
| 2023/0245139 | A1* | 8/2023 | Shen | G06Q 30/0185 705/318 |
| 2024/0256656 | A1* | 8/2024 | Maia | G06F 21/554 |
| 2025/0124136 | A1* | 4/2025 | Jou | G06F 21/577 |

OTHER PUBLICATIONS

Jin, Di, et al., "A survey of community detection approaches: From statistical modeling to deep learning," in IEEE Transactions on Knowledge and Data Engineering, 2021.

M. E. Newman, "Detecting community structure in networks," The European physical journal B, vol. 38, No. Springer, pp. 321-330, 2004.

Hagberg, Aric, Pieter Swart, and Daniel S Chult, "Exploring network structure, dynamics, and function using NetworkX," Proceedings of the 7th Python in Science Conference (SciPy2008), pp. 11-15, Aug. 2008.

Miettinen, Markus, et al., "ConXsense—Automated Context Classification for Context-Aware Access Control," Proceedings of the 9th ACM symposium on Information, computer and communications securit, pp. 293-304, 2014.

Phiayura, Pacharee, and Songpon Teerakanok. "A Comprehensive Framework for Migrating to Zero Trust Architecture." IEEE Access 11 (2023): 19487-19511.

Y. G. A. Q. Zhu, "Trust Threshold Policy for Explainable and Adaptive Zero-Trust Defense in Enterprise Networks," IEEE Conference on Communications and Network Security (CNS),, pp. 359-364, 2022.

Windows Hello for Business. https://learn.microsoft.com/en-us/windows/security/identity-protection/hello-for-business/hello-overview.

Azure AD Identity Protection. https://learn.microsoft.com/en-us/azure/active-directory/identity-protection/concept-identity-protection-policies.

Microsoft Graph. https://learn.microsoft.com/en-us/graph/tutorial-riskdetection-api.

Microsoft Intune. https://learn.microsoft.com/en-us/mem/intune/fundamentals/zero-trust-with-microsoft-intune.

Graph API. https://learn.microsoft.com/en-us/graph/security-concept-overview.

Microsoft Purview eDiscovery. https://learn.microsoft.com/en-us/mem/intune/fundamentals/zero-trust-with-microsoft-intune.

* cited by examiner

COMMUNITY-BASED SITUATION-AWARE ACCESS CONTROL ENFORCEMENT IN ZERO TRUST ARCHITECTURES

COPYRIGHT AND MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNOLOGICAL FIELD OF THE DISCLOSURE

Embodiments disclosed herein generally relate to zero trust architectures (ZTAs). More particularly, at least some embodiments relate to systems, hardware, software, computer-readable media, and methods for community-based situation aware access control enforcement in a ZTA.

BACKGROUND

Most risk-based access control developments focus on determining user-specific and device-specific scores based on their static or entry point attributes but do not consider how to carry out risks and tolerance as a function of the system and network environment situation. While there are a variety of approaches that condition user risk on types of authentications, such approaches do not consider how entities pose risks to the communities they typically relate to.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
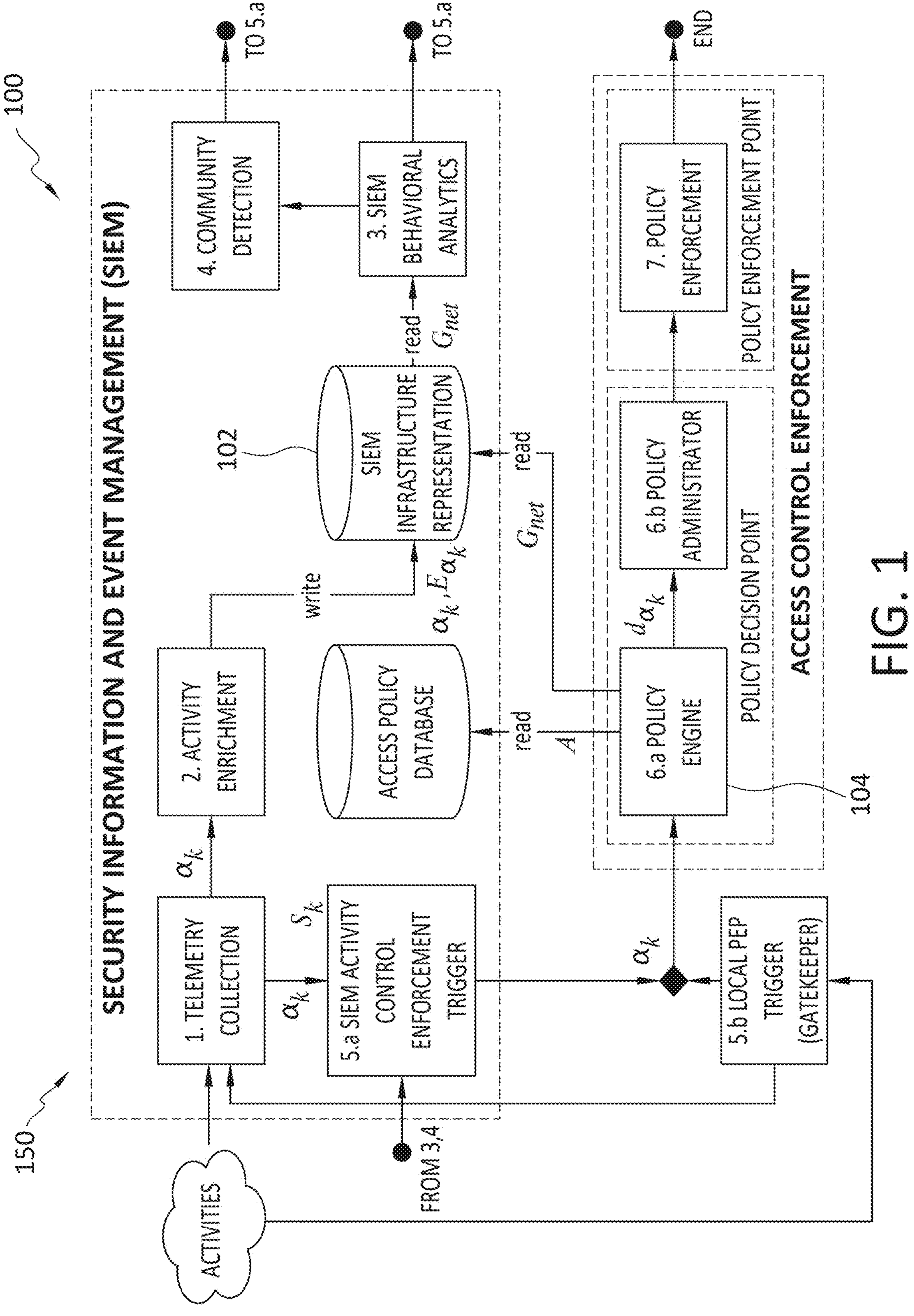
FIG. 1 discloses aspects of a security information and event management system (SIEM).

Embodiments disclosed herein generally relate to zero trust architectures (ZTAs). More particularly, at least some embodiments relate to systems, hardware, software, computer-readable media, and methods for community-based situation aware access control enforcement in a ZTA.

One or more example embodiments may be implemented in an environment that comprises a ZTA, and such embodiment(s) may employ an SIEM infrastructure representation database. In one embodiment, a knowledge graph may be generated, or exist, that stores and models all ZTA activity data. In the knowledge graph, entities may be represented by respective nodes, also sometimes referred to as vertices, and the nodes of entities that communicate information to each other may be connected by edges.

One embodiment of such a method as referred to above may comprise operations including: using a community detection (CD) technique to segment the graph into communities of nodes; computing a risk of granting access, such as to a resource of a network for example, to one or more of the entities represented in the graph; when one of the entities is determined to have a risk value that exceeds a threshold, notifying an entire ZT environment, in which the communities operate, of a possible threat; detecting the community to which the entity, whose risk value exceeds the threshold, belongs; computing a confidence score for the entity; and propagating the confidence score to other members of the community to which the entity belongs.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that an embodiment may automatically determine, based on situational awareness, network and system boundaries of a portion of a ZTA where a risk or threat has been identified. An embodiment may dynamically determine, as conditions change in a ZTA, risk and tolerance scores, pertaining to an entity, based on conditions of members of a community to which the entity belongs. An embodiment may, within automatically determined network and system boundaries, automatically perform an access reevaluation for one or more nodes based on modifications to an environment resulting from observed suspicious behaviors by, or involving, the nodes. Various other advantages of one or more example embodiments will be apparent from this disclosure.

A. References

The following materials are incorporated herein in their respective entireties by this reference. Where specifically mentioned herein, the materials may be referred to by their respective [X] number.

[1] DISA, NSA, "*Department of Defense Zero Trust Reference Architecture,*" 2022.

[2] Jin, Di, et al., "*A survey of community detection approaches: From statistical modeling to deep learning,*" *in IEEE Transactions on Knowledge and Data Engineering,* 2021.

[3] M. E. Newman, "*Detecting community structure in networks,*" *The European physical journal B, vol.* 38, no. Springer, pp. 321-330, 2004.

[4] Hagberg, Aric, Pieter Swart, and Daniel S Chult, "*Exploring network structure, dynamics, and function using NetworkX,*" *Proceedings of the 7th Python in Science Conference* (*SciPy*2008), pp. 11-15, August 2008.

[5] Miettinen, Markus, et al., "*ConXsense—Automated Context Classification for Context-Aware Access Control,*" *Proceedings of the 9th ACM symposium on Information, computer and communications security*, pp. 293-304, 2014.

[6] Phiayura, Pacharee, and Songpon Teerakanok. "*A Comprehensive Framework for Migrating to Zero Trust Architecture.*" *IEEE Access* 11 (2023): 19487-19511.

[7] Y. Ge, and Q. Zhu, "*Trust Threshold Policy for Explainable and Adaptive Zero-Trust Defense in Enterprise Networks,*" *IEEE Conference on Communications and Network Security* (*CNS*), pp. 359-364, 2022.

B. Example Context for One Embodiment

The following is a discussion of aspects of an example context for one embodiment. This discussion is not intended to limit the scope of any claims, or this disclosure, or the applicability of the embodiments, in any way.

The DoD (Department of Defense) Reference Architecture (ZTRA), disclosed in [1], defines several postures that must be employed in order to increase network cybersecurity. In particular, activities are only allowed in the network by Policy Enforcement Points (PEPs) as the result of the evaluations performed in Policy Decision Points (PDPs). The policies require the computation of dynamic confidence scores conditioned on entities involved in the activity under assessment. The ZTRA core entities are as follows:

User: attributes determining the user context, for example: its device health, location, time, and behavior.

Device: activities within a particular device must consider its hygiene—for example, inventory and system logs, update status, and dynamic instrumentation—it is noted that a device can be a requester, or a target, of an activity.

Application: its sensitivity and risk tolerance. Although not directly discussed by reference documents, it is natural to consider that the application risk tolerance can be dynamic depending on its operational state—for example, whether an application has sockets opened to sensitive data or not.

Data: ZT emphasizes the usage of data tags to prevent data loss or exfiltration. Summarizing document content in tags allows to simplify policy definition.

A Security Information and Event Management (SIEM) system has the role of logging and analyzing network activities to develop the confidence scores for entities in the network based on attributes from the ZTRA entities for PDP usage in the ZTRA. Effective computation of the scores requires integrating network and system states to the policy decision framework. Within the network, core entities might unconsciously form groups, also referred to as communities, based on similarity of activities performed by the entities. In particular, suspicious core entities in the network are likely to interact with members of communities they belong to, therefore indicating potential proxies of next attack vectors in the network.

In light of this background, one embodiment is directed to the challenge of identifying risks, imposed by the activities of one or more members of a community, to other community members, so as to consider community situation awareness in confidence level computations. In more detail, one embodiment may involve addressing the following challenges:

identifying the community to which suspicious entities belong; and recomputing confidence scores, and re-evaluating access enforcement, for the community members in light of changes in situational awareness, that is, in light of possibly problematic circumstances, in the network, of which the system has become aware.

Thus, an embodiment may implement the propagation of risk assessment information through identified communities so that community members are made aware of potential threats and problematic behavior undertaken by one or more other members of the community.

C. Overview of Aspects of One Embodiment

One example embodiment comprises a situation-awareness mechanism for ZT access control enforcement, thus addressing one of the many open problems to achieve most mature levels of ZTAs. One embodiment comprises a situation-aware access control system compatible with ZTRA specifications by leveraging on the status of community entities when computing confidence scores. To identify such communities, an embodiment may rely on community detection. In one example approach, a system and method according to one embodiment re-evaluate previously granted access due to modifications in situational conditions of members in the community, resulting in an automatic mechanism to determine which suspicious entities impact on others.

One embodiment may assume the availability of a SIEM (Security Information and Event Management) infrastructure representation database, containing information identifying both IT infrastructure activities and the entities within the infrastructure and their relationships. A full definition of a SIEM infrastructure representation is set forth below. In an embodiment, the SIEM database provides the basis for detecting communities formed by entities in the ZT environment and for determining how malicious agents might propagate through the infrastructure. Thus, one example embodiment may comprise the following elements and operations:

1. (part 1. in FIG. 1) Telemetry is collected for keeping traceability and data lineage with respect to the core entities.
2. (part 2. in FIG. 1) The collected telemetry is used to update the SIEM infrastructure representation database. In this operation, incoming infrastructure activities are annotated with the corresponding core entities as follows:
   a. if an infrastructure activity is an entry point—for example, an initial access request to a PEP—then the identities of the core entities are communicated by the entry point itself—for example, the user identity is obtained from authentication process; and
   b. otherwise, the infrastructure activity is propagated through the infrastructure activities by building upon telemetry traceability.

3. (part 3. in FIG. 1) Behavioral analytics is performed on top of the SIEM Infrastructure representation to determine integrity state of individual entities in the infrastructure. Detection of suspicious entities trigger access control enforcement, addressed in part 5 below.
4. (part 4. in FIG. 1) SIEM Infrastructure Representation is split into communities. Access control enforcement is triggered to community members of the suspicious entities.
5. (parts 5.a and 5.b in FIG. 1) Whenever triggered, the decision point, or PDP, determines the access policies and dynamically computes the required confidence scores. These scores are statistics of network and system states, as well as the community they belong to, thereby accounting for the content and situation of the infrastructure.
   a. To reflect stablished practices on risk-based access decisions, the statistics are split into two competing scores with disjoint groups of core entities participating in their computation: risk versus tolerance. The decision is established considering the evaluation of access policies upon these scores and other entity attributes.
   b. Risk and tolerance scores are modified depending on the status of the communities that the access evaluation entities pertain to.
6. (part 6. in FIG. 1) The PDP performs an evaluation of the risk and tolerance scores and decides whether the risk/tolerance for an entity meets an acceptable threshold.
7. (part 7. in FIG. 1) The corresponding PEP receives the decision from the PDP and performs access control enforcement with respect to the entity.

As apparent from the preceding discussion of aspects of an embodiment, and from the rest of this disclosure, an embodiment may possess various useful features and aspects, although no embodiment is required to possess any of such useful features or aspects. The following examples are illustrative, but not exhaustive. An embodiment may comprise a system, and corresponding method, that may automatically determine the network and system boundaries of situation-aware risk and tolerance through the usage of community detection algorithms. An embodiment may dynamically determine risk and tolerance scores as a function of the conditions of the community members. An embodiment may implement, or at least enable, access re-evaluation due to modifications of the environment situation whenever suspicious behaviors are encountered considering these automatically defined boundaries.

D. Detailed Discussion of Aspects of One Embodiment

D.1 Introduction

Zero Trust tenets specify that infrastructure activities are never to be trusted but always verified. Access is to be denied by default. Every information flow within the IT infrastructure involving a core entity such as, for example, a user, device, application, or data, requires the entity to be authenticated and the entity must be explicitly authorized. That is, even if an entity is authenticated, the entity must still then be authorized to perform a desired activity or operation. Merely being authenticated does not, by itself, enable an entity to perform a desired activity or operation.

Zero Trust (ZT) tenets provide that the decision-making process must be enriched with contextual and situational information which results in so-called dynamic policies. Situational awareness in this context refers to the capability to dynamically modify a decision-making process, such as with respect to authorization—or not—of an entity to perform a desired activity or operation, based on the presence of potential malicious behavior observed in the infrastructure. One embodiment comprises a mechanism operable to provide situation-awareness based on community patterns arising in the IT infrastructure by providing for automatic determination of an extent to which potential threats affect the decision-making process within Zero Trust access control evaluations.

D.2 Community Detection

Community Detection (CD) algorithms focus on splitting a graph into groups of vertices/nodes. In one embodiment, the graph is obtained from the SIEM infrastructure representation database, containing information identifying both IT infrastructure activities and the entities within the infrastructure and their relationships. These groups may be referred to herein as communities, or clusters, and are built according to similarity measures between nodes. CD algorithms rely on the information encoded in graph topology to identify modules and their hierarchical organization. The result is a set of detected communities in which nodes from the same community are densely connected, that is, those nodes, have maximal similarity to each other, and nodes from different communities are less connected, that is, those nodes have minimal similarity to each other.

Splitting a graph into groups enables the classification of nodes, or vertices, based on their structural position in the graph. Depending on the resulting set(s) of groups found, vertices that share many edges with the other group nodes may have an important function of control and stability within the group, while nodes at the boundary of a community may play mediation and lead exchanges between different communities. One approach that may be used for splitting graphs into communities is the Girvan-Newman algorithm. Further information concerning CD is disclosed in references [2] and [3].

D.3 Discussion

One example embodiment comprises an access control system, and associated method carried out by the access control system, that leverages the status of community entities when computing confidence scores of Zero Trust access policies as depicted in the example of FIG. 1, which discloses an architecture 100 and overall method 150 for a community-driven situational-aware access enforcement system. In an embodiment, the method 150 comprises the operations indicated at parts 1. through 7. of FIG. 1, and discussed earlier herein. Certain elements of the architecture 100 are addressed below.

D.3.1 SIEM Infrastructure Representation

An embodiment may assume the availability of a database 102 corresponding to the infrastructure representation built from telemetry, namely, SIEM infrastructure representation. The information in the database 102, which may comprise a graph as disclosed herein, may provide a basis for detecting communities formed by entities in the ZT environment and how malicious agents might propagate through the infrastructure.

In one type of infrastructure representation, each node represents an entity, and two nodes are connected by a semantic edge if they are related. It is noted that nodes and edges can have as many attributes as required to create a proper ZT environment, which can be beneficial to some CD algorithms while detecting communities. The database 102 may contain entities and activities of the IT infrastructure as follows:

Let $\alpha_k \in \mathcal{A}_{net}$ denote an activity with subscript k referring to its position in the set of all SIEM observed activities $\mathcal{A}_{net}$.

Activities may be described as a triple, i.e., $\alpha_k=(\nu_i, \tau, \nu_j)$ denotes an activity connecting entity $\nu_i$ to $\nu_j$ through relation $\tau \in T$.

Let $\mathcal{V}_{net}$ and $\mathcal{A}_{net}$ respectively represent the set of all infrastructure entities and activities.

Then, let $\mathcal{G}_{net}=(\mathcal{V}_{net}, \varepsilon_{net})$ denote a knowledge graph representing the infrastructure entities $\mathcal{V}_{net}$ and structure $\varepsilon_{net}$.

For an activity $\alpha_k=(\nu_i, \tau, \nu_j)$, $\nu_i$, $\nu_j \in \mathcal{V}_{net}$ and $\alpha_k \in \varepsilon_{net}$.

It is noted that $\mathcal{A}_{net} \subset \varepsilon_{net}$. However, infrastructure structure is also determined by information beyond activities such as its inventory, its attributes, and the associated ontology $\mathcal{O}_{net}$. These sets are disjoint, i.e., $\mathcal{A}_{net} \cap \mathcal{O}_{net}=\emptyset$.

Likewise, IT infrastructure entities can be split into disjoint sets. Let:

$u_i \in \mathcal{U}$ denote a user.

$y_i \in \mathcal{Y}$ denote a device.

$p_i \in \mathcal{P}$ denote an application.

$d_i \in \mathcal{D}$ denote data.

$r_i \in \mathcal{R}$ denote any other entities.

Then, let $c_i \in \mathcal{C}$ denote a core entity. As specified by ZTRA, we have that $\mathcal{C}=\mathcal{U} \cup \varepsilon \cup \mathcal{P} \cup \mathcal{D}$. It is noted that $\mathcal{C}$ determines all entities for which an embodiment of the system must verify access.

Finally, edges may also have shared weights according to core entities participating in the activity to obtain a proxy of their relevance within the infrastructure. In one embodiment, this relevance may be expressed as simply the count in a time window, or a time decaying function.

D.3.2 Community Detection

In part 3. of FIG. 1, the integrated SIEM infrastructure representation, which may be in the form of the graph $G_{net}$ is provided as input to a CD technique, as shown at part 4. Any data transformation required to transform the input data into the expected representation, such as the graph $G_{net}$ for example, for the CD technique can be performed using network representation libraries, such as NetworkX, details of which are disclosed in reference [4], for example, that builds in-memory graphs and performs the partitioning of the nodes of a graph into communities in few lines of code.

Formally, a module implementing part 4. may comprise using a CD algorithm to partition G according to a similarity measure suitable for the ZT environment. One embodiment may operate to group entities according to their respective activities, as those activities are modelled in the graph. The expected output is the partition of $G_{net}$ into k sets of nodes $\{g_1, g_2, \ldots, g_k\}$, which are the identified communities.

Finding the optimal k is not required in one embodiment, although, as disclosed in reference [2], there are algorithms in which k can be automatically estimated based on the problem structure. Such algorithms may include, for example, non-negative matrix factorization methods, and hierarchical clustering methods. The hierarchical clustering methods may avoid the requirement of estimating a value for the k parameter, but either of the aforementioned approaches may be employed in an embodiment.

D.3.3 Risk-Based Access Decisions

In one embodiment, whenever the control enforcement system is triggered, its policy engine 104 identifies the community where such threat was detected and produces confidence scores conditioned on the SIEM infrastructure representation. One, or several, core entities might be affected by a single threat, so each community may be impacted. Then, an embodiment of the system may identify the members of the same community, that is, the same community that includes an entity associated with the detected threat, and updates confidence scores according to the suspicious behavior detected.

In more detail, let s denote the suspicious set of core entities, responsible for triggering the system, C the set of communities $\{g_1, g_2, \ldots, g_k\}$, $f$ the confidence score function, and r a risk function to determine the risk associated with a particular request using context information. One embodiment of a system may perform the following operations:

1. The control enforcement system determines the risk of grating access to an entity s using r. If r(s) is greater than a threshold value, it alerts the entire ZT environment.
2. The system identifies the community $g_k$ this entity belongs to.
3. The system computes the confidence score of s using a given function $f$.
4. Then, the system propagates the risk to the members of $c_k$ as follows→for each $i \in c_k$, compute $f(i, r(s))$.

Any algorithm for access control based on contextual information may be employed in one or more embodiments, and the same is likewise true for a risk function that determines the risk of granting access to an entity to access the IT infrastructure. One possible embodiment for access control is conXsense, details of which are provided in reference [5], which is a context-aware access control on mobile devices based on context classification. conXsense relies on context profiling and machine learning techniques on real-world data collected for making context-aware access control decisions.

E. Example Scenario for an Embodiment

Figure 2:
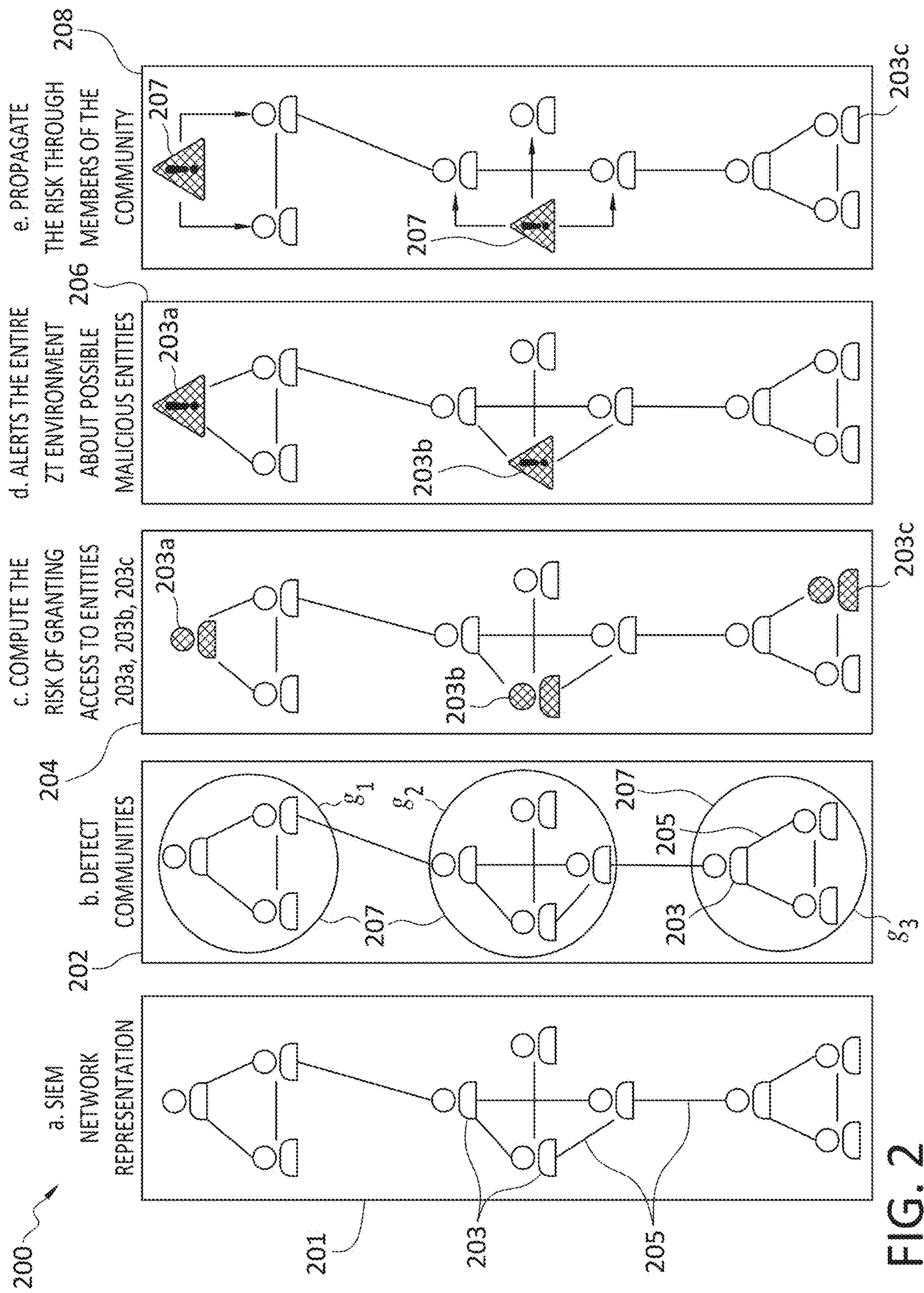
FIG. 2 discloses aspects of a method according to one example embodiment.

With attention now to FIG. 2, details are provided concerning an example method 200 according to one embodiment. Consider the following scenario in the context of FIG. 2.

Assume that there is a Zero-Trust Architecture governing the access authentication system of a company. The system has a Knowledge Graph G that stores and models all ZTA activity data as presented in FIG. 2 at 201. Each entity is represented by a node 203, and the relationships between the nodes 203 are represented as edges 205 in the graph. To simplify this illustrative, and non-limiting, example, consider each entity, represented by a node 203, as a user, but, in a more general case, nodes or entities can be any chosen set of network resource types. Two entities are deemed to be connected if they exchange information with each other.

The first operation of the method 200 is to detect communities in G and then segment G into communities 202.

Using CD techniques, examples of which are disclosed herein, it is possible to segment G into communities, that is, groups of nodes or vertices, as disclosed herein. In the example of FIG. 2, the segmentation process has identified three communities $g_1$, $g_2$ and $g_3$, as indicated at 207.

Next, the system computes 204 the risk of granting access to one or more of the entities 203, namely, entities 203*a*, 203*b*, and 203*c*. Assuming, for the sake of illustration, that two of these entities 203, namely, entities 203*a* and 203*b*, have a value of r greater than the pre-defined threshold, the whole ZT environment is then notified 206 about possible threats related to those two entities 203*a* and 203*b*. Then, the system detects that such entities belong to communities $c_1$ and $c_2$. Finally, the system computes the confidence score of each entity using a given function $f$, and propagates 208 risk information 207, which may include the confidence scores of the entities 203*a* and 203*b*, to the other members of the respective communities that include the entities 203*a* and 203*b*.

F. Example Methods

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

G. Further Example Embodiments

Following are some further example embodiments. These are presented only by way of example and are not intended to limit the scope of this disclosure or the claims in any way.

Embodiment 1. A method for controlling access in zero-trust architectures, comprising: identifying, in a knowledge graph that represents a ZT (zero trust) environment, communities that each comprise one or more entities; computing a risk of granting access to one of the entities; when the risk exceeds a threshold, alerting the ZT environment in its entirety about a possible threat involving the entity regarding which the risk was computed; and propagating information about the threat to the entities that are members of the community to which the one entity belongs.

Embodiment 2. The method as recited in any preceding embodiment, wherein the communities are identified using a CD (community detection) algorithm.

Embodiment 3. The method as recited in any preceding embodiment, wherein the identification of the communities is performed automatically.

Embodiment 4. The method as recited in any preceding embodiment, wherein the risk is determined as a function of respective conditions of the entities that are members of the community to which the one entity belongs.

Embodiment 5. The method as recited in any preceding embodiment, wherein the risk is determined dynamically in response to a change in conditions of one of the entities.

Embodiment 6. The method as recited in any preceding embodiment, wherein the risk of granting access to one of the entities comprises a risk that the one entity represents a threat to a network resource to which the entity has requested, or may request, access to.

Embodiment 7. The method as recited in any preceding embodiment, wherein the entities comprise respective hardware and/or software.

Embodiment 8. The method as recited in any preceding embodiment, wherein access is granted to the entity when the risk is below the threshold.

Embodiment 9. The method as recited in any preceding embodiment, wherein computing the risk comprises computing a risk for an application operating as one of the entities in the ZT environment, and the risk for the application is a function of one or both of a sensitivity of the application to a threat, and a risk tolerance of the application.

Embodiment 10. The method as recited in any preceding embodiment, wherein when the possible threat is detected, respective confidence scores of one or more of the entities are updated.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 3:
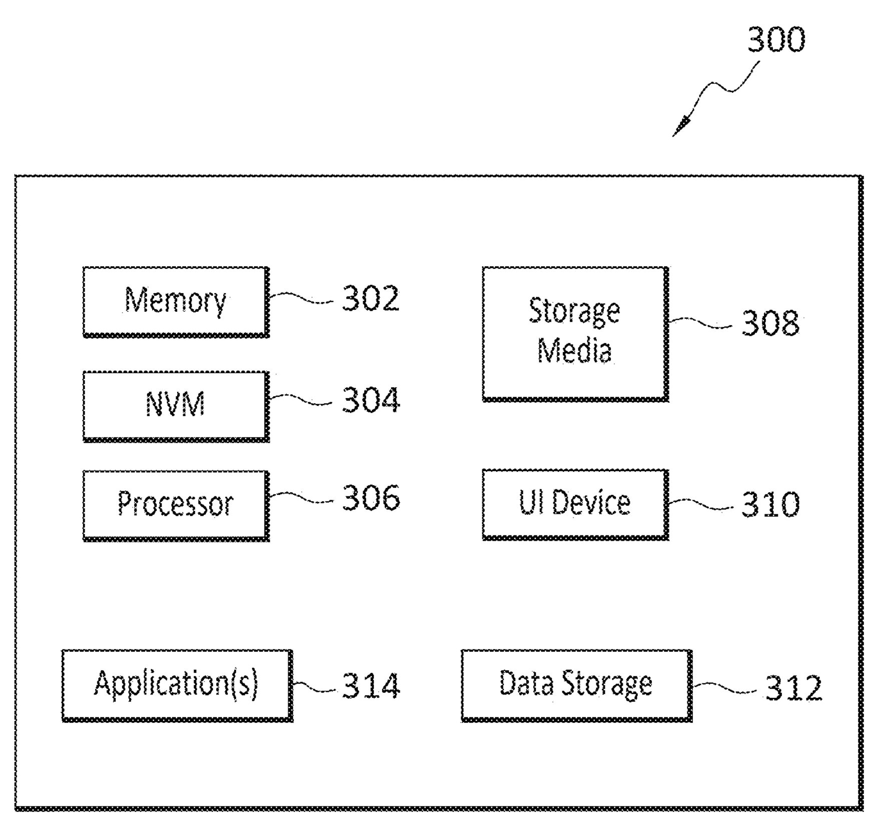
FIG. 3 discloses a computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method for controlling access in zero-trust architectures, said method comprising:

identifying, in a knowledge graph that represents a ZT (zero trust) environment, communities that each comprise one or more entities;

computing a risk of granting access to one of the entities;

computing a confidence score for the entity using a function that takes as input the risk of granting the access to the entity;

evaluating, by a policy decision point, the risk in conjunction with a tolerance for the entity, wherein the policy decision point determines whether a combination of the risk and the tolerance for the entity meets a threshold;

when the combination of the risk and the tolerance exceeds the threshold, alerting the ZT environment in its entirety about a possible threat involving the entity regarding which the risk was computed;

propagating the confidence score to other members of the community to which the entity belongs; and in response to the propagated confidence score, updating, for the other members of the community, confidence scores for those other members according to the propagated confidence score, wherein the updated confidence scores are usable to re-evaluate access policies within the ZT environment.

2. The method as recited in claim 1, wherein the communities are identified using a CD (community detection) algorithm.

3. The method as recited in claim 1, wherein the identification of the communities is performed automatically.

4. The method as recited in claim 1, wherein the risk is determined as a function of respective conditions of the entities that are members of the community to which the one entity belongs.

5. The method as recited in claim 1, wherein the risk is determined dynamically in response to a change in conditions of one of the entities.

6. The method as recited in claim 1, wherein the risk of granting access to one of the entities comprises a risk that the one entity represents a threat to a network resource to which the entity has requested, or may request, access to.

7. The method as recited in claim 1, wherein the entities comprise respective hardware and/or software.

8. The method as recited in claim 1, wherein access is granted to the entity when the risk is below the threshold.

9. The method as recited in claim 1, wherein computing the risk comprises computing a risk for an application operating as one of the entities in the ZT environment, and the risk for the application is a function of one or both of a sensitivity of the application to a threat, and a risk tolerance of the application.

10. The method as recited in claim 1, wherein when the possible threat is detected, respective confidence scores of one or more of the entities are updated.

11. A non-transitory storage medium having stored therein instructions that are executable by one or more hardware processors to perform operations comprising:

identifying, in a knowledge graph that represents a ZT (zero trust) environment, communities that each comprise one or more entities;

computing a risk of granting access to one of the entities;

computing a confidence score for the entity using a function that takes as input the risk of granting the access to the entity;

evaluating, by a policy decision point, the risk in conjunction with a tolerance for the entity, wherein the policy decision point determines whether a combination of the risk and the tolerance for the entity meets a threshold;

when the combination of the risk and the tolerance exceeds the threshold, alerting the ZT environment in its entirety about a possible threat involving the entity regarding which the risk was computed;

propagating the confidence score to other members of the community to which the entity belongs; and in response to the propagated confidence score, updating, for the other members of the community, confidence scores for those other members according to the propagated confidence score, wherein the updated confidence scores are usable to re-evaluate access policies within the ZT environment.

12. The non-transitory storage medium as recited in claim 11, wherein the communities are identified using a CD (community detection) algorithm.

13. The non-transitory storage medium as recited in claim 11, wherein the identification of the communities is performed automatically.

14. The non-transitory storage medium as recited in claim 11, wherein the risk is determined as a function of respective conditions of the entities that are members of the community to which the one entity belongs.

15. The non-transitory storage medium as recited in claim 11, wherein the risk is determined dynamically in response to a change in conditions of one of the entities.

16. The non-transitory storage medium as recited in claim 11, wherein the risk of granting access to one of the entities comprises a risk that the one entity represents a threat to a network resource to which the entity has requested, or may request, access to.

17. The non-transitory storage medium as recited in claim 11, wherein the entities comprise respective hardware or software.

18. The non-transitory storage medium as recited in claim 11, wherein access is granted to the entity when the risk is below the threshold.

19. The non-transitory storage medium as recited in claim 11, wherein computing the risk comprises computing a risk for an application operating as one of the entities in the ZT environment, and the risk for the application is a function of one or both of a sensitivity of the application to a threat, and a risk tolerance of the application.

20. The non-transitory storage medium as recited in claim 11, wherein when the possible threat is detected, respective confidence scores of one or more of the entities are updated.

* * * * *